United States Patent
Sudar et al.

(10) Patent No.: US 11,659,135 B2
(45) Date of Patent: May 23, 2023

(54) SLOW OR FAST MOTION VIDEO USING DEPTH INFORMATION

(71) Applicant: Corephotonics Ltd., Tel-Aviv (IL)

(72) Inventors: Ron Sudar, Netanya (IL); Ester Bar-El, Modi'in Makabim-Re'ut (IL)

(73) Assignee: Corephotonics Ltd., Tel Aviv (IL)

( * ) Notice: Subject to any disclaimer, the term of this patent is extended or adjusted under 35 U.S.C. 154(b) by 81 days.

(21) Appl. No.: 17/073,949

(22) Filed: Oct. 19, 2020

(65) Prior Publication Data
US 2021/0133475 A1  May 6, 2021

Related U.S. Application Data

(60) Provisional application No. 62/928,014, filed on Oct. 30, 2019.

(51) Int. Cl.

| | | |
|---|---|---|
| G06T 7/521 | (2017.01) | |
| G06T 7/10 | (2017.01) | |
| G06V 10/25 | (2022.01) | |
| G06F 18/24 | (2023.01) | |
| G06V 20/40 | (2022.01) | |
| H04N 5/783 | (2006.01) | |

(52) U.S. Cl.
CPC ............. *H04N 5/783* (2013.01); *G06F 18/24* (2023.01); *G06T 7/10* (2017.01); *G06T 7/521* (2017.01); *G06V 10/25* (2022.01); *G06V 20/42* (2022.01); *G06V 20/46* (2022.01)

(58) Field of Classification Search
CPC ........ G06V 10/25; G06V 20/42; G06V 20/46; G06K 9/6267; G06T 7/10; G06T 7/521; G11B 27/031; H04N 5/783

USPC ........................................................ 382/103
See application file for complete search history.

(56) References Cited

U.S. PATENT DOCUMENTS

| | | |
|---|---|---|
| 4,199,785 A | 4/1980 | McCullough et al. |
| 5,005,083 A | 4/1991 | Grage et al. |
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |

(Continued)

FOREIGN PATENT DOCUMENTS

| | | |
|---|---|---|
| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.

(Continued)

*Primary Examiner* — Amandeep Saini
(74) *Attorney, Agent, or Firm* — Menachem Nathan; Nathan & Associates

(57) ABSTRACT

Systems comprising a digital camera, an interface operable to mark a first entity in a frame of an input video stream and to determine a frame rate ratio FR1/FR2 between a first frame rate FR1 and a second frame rate FR2, a processor configurable to generate an output video stream of the digital camera, wherein the output video stream includes a first entity played at FR1 and a second entity played at FR2, and methods of using and providing same.

24 Claims, 10 Drawing Sheets

(56) References Cited

U.S. PATENT DOCUMENTS

| | | |
|---|---|---|
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1* | 8/2007 | Imagawa ............. G06T 7/246 348/E5.042 |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |

(56) References Cited

U.S. PATENT DOCUMENTS

| | | |
|---|---|---|
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0180761 A1* | 7/2009 | Wand .................. H04N 19/20 375/E7.076 |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1* | 7/2014 | Laroia .................. G02B 13/16 348/360 |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Fang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |
| 2019/0215438 A1* | 7/2019 | Lee .................. H04N 5/232061 |
| 2019/0265875 A1* | 8/2019 | Park .................. G06F 3/04886 |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |

(56) References Cited

FOREIGN PATENT DOCUMENTS

| | | | |
|---|---|---|---|
| JP | 2007306282 A | 11/2007 | |
| JP | 2008076485 A | 4/2008 | |
| JP | 2010204341 A | 9/2010 | |
| JP | 2011085666 A | 4/2011 | |
| JP | 2013106289 A | 5/2013 | |
| KR | 20070005946 A | 1/2007 | |
| KR | 20090058229 A | 6/2009 | |
| KR | 20100008936 A | 1/2010 | |
| KR | 20140014787 A | 2/2014 | |
| KR | 101477178 B1 | 12/2014 | |
| KR | 20140144126 A | 12/2014 | |
| KR | 20150118012 A | 10/2015 | |
| WO | 2000027131 A2 | 5/2000 | |
| WO | 2004084542 A1 | 9/2004 | |
| WO | 2006008805 A1 | 1/2006 | |
| WO | 2010122841 A1 | 10/2010 | |
| WO | 2014072818 A2 | 5/2014 | |
| WO | 2017025822 A1 | 2/2017 | |
| WO | 2017037688 A1 | 3/2017 | |
| WO | 2018130898 A1 | 7/2018 | |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: EUROGRAPHICS, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office Action in related EP patent application No. 19845570.1, dated Jun. 9, 2020. 10 pages.

\* cited by examiner

SLOW OR FAST MOTION VIDEO USING DEPTH INFORMATION

CROSS REFERENCE TO RELATED APPLICATIONS

This application is related to and claims priority from US Provisional Patent Application No. 62/928,014 filed Oct. 30, 2019, which is incorporated herein by reference in its entirety.

FIELD

Embodiments disclosed herein relate in general to video generation and processing.

BACKGROUND

In known art, a recorded video stream is played with a sequentially constant frame rate (FR), with the option for the user to change the frame rate for all or some sequences of frames and to make these sequences appear in slow motion or time lapse. The slow motion or time lapse video streams are generated by a sequence of input frames that are played with a modified FR with respect to the FR used to capture the scene.

In highly professional setups such as the movie industry, there is an additional method, where the FR is controlled and modified only for some specific spatial information of the input frames. This is done mainly to highlight specific persons, objects or scenes, by playing the areas to be highlighted with a different frame rate than the rest of the frame.

For visual effects and improved user experience, it would be beneficial to have a system and method that generates the playing of areas to be highlighted with a different frame rate than the rest of the frame in an automated manner and under existing processing power constraints in devices such as smartphones or tablets.

SUMMARY

In various embodiments there are provided systems, comprising a digital camera, an interface operable to mark a first entity in a frame of an input video stream and to determine a frame rate ratio FR1/FR2 between a first frame rate FR1 and a second frame rate FR2, and a processor configurable to generate an output video stream of the digital camera, wherein the output video stream includes a first entity played at FR1 and at least one second entity played at FR2.

In an exemplary embodiment, the first entity is an object of interest (OOI) or region of interest (ROI) and the at least one second entity is selected from the group consisting of another object, an image foreground, an image background and a combination thereof.

In an exemplary embodiment, the output video stream includes at least one added entity played at a frame rate that is different from the first FR and the second FR.

In an exemplary embodiment, the given input stream includes at least one given entity played at a frame rate that is different from the first FR and the second FR.

In an exemplary embodiment, the interface is operable by a human user.

In an exemplary embodiment, the interface is operable by an application or by an algorithm.

In an exemplary embodiment, the OOI or the ROI is identified in at least a single frame of the input video stream with an object classification or an object segmentation algorithm.

In an exemplary embodiment, the OOI or ROI is tracked at least through a part of input video stream with a tracking algorithm.

In an exemplary embodiment, the processor is further configured to use a depth map stream that is spatially and temporally aligned with the input video stream to generate the output video stream.

In an exemplary embodiment, the depth map is used to determine a depth of each entity.

In an exemplary embodiment there is provided a method, comprising: in a digital camera configured to obtain an input video stream and to output an output video stream, marking a first entity in a frame of the input video stream, determining a frame rate ratio FR1/FR2 between a first frame rate FR1 and a second frame rate FR2, and generating the output video stream, wherein the output video stream includes a first entity played at FR1 and a second entity played at FR2.

In an exemplary embodiment, the method further comprises using a depth map to determine a depth of each entity.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

Definitions

"Entity": a section or part of a RGB frame with information different from other sections or parts of the frame. Examples of such an entity are objects of interest (OOIs) or regions of interest (ROIs), as well as their respective foreground and background. The objects or regions of interests can be selected manually by the user or automatically by a dedicated algorithm.

"Assigned depth": depth information on single pixels or segments of a RGB image which is obtained from a depth map that covers the same scene from the same (or similar) point of view (POV) as the RGB image.

"Selected Depth" (SD): depth of one or more selected objects in the RGB image.

"SD$^+$": depths that are further away from the camera than SD.

"SD$^-$": depths that are closer to the camera than SD.

"Binned Depth Map" (BDM): a depth map that classifies the originally continuous depth map into a discrete depth map of several classes, each class covering a range of specific depths. Here, we use 2-class and 3-class BDMs.

"Frame Rate Mask" (FRM): a binary mask that includes all pixels that are to be played with a first frame rate (FR1), with the part outside of the mask are played with a second frame rate (FR2). Per definition, SD is played in FR1 while SD$^+$ is played in FR2. In a general case, a plurality of FRMs with different frame rates, e.g. FR3, FR4 or FR5, may be provided. In this case, the FRM expands to a mask discriminating 3, 4 or 5 pixel groups.

Figure 3:
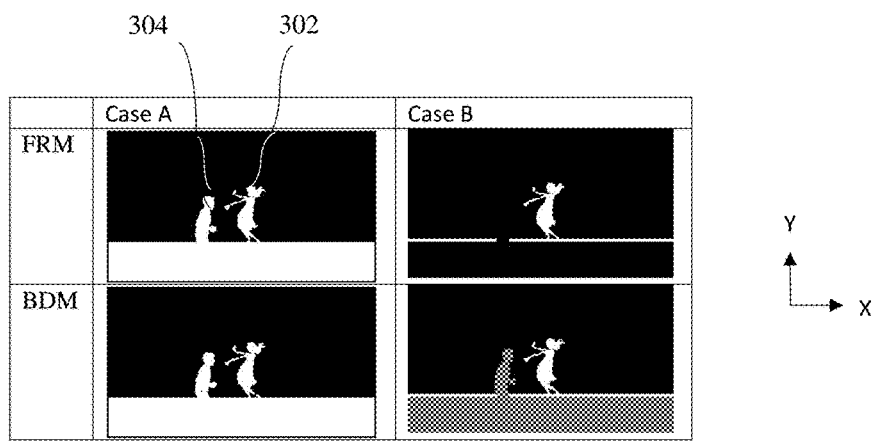
FIG. 3 illustrates respective frame rate masks and binned depth maps of a specific image for two different cases.

"$P_{FR1}$": group of pixels played in FR1 (marked in white in the FRM presented e.g. in FIG. 3).

"$P_{FR2}$": group of pixels played in FR2 (marked in black in the FRM presented e.g. in FIG. 3).

"$P_{FR3}$": group of pixels played in FR3 (not shown in the figures herein).

Figure 1:
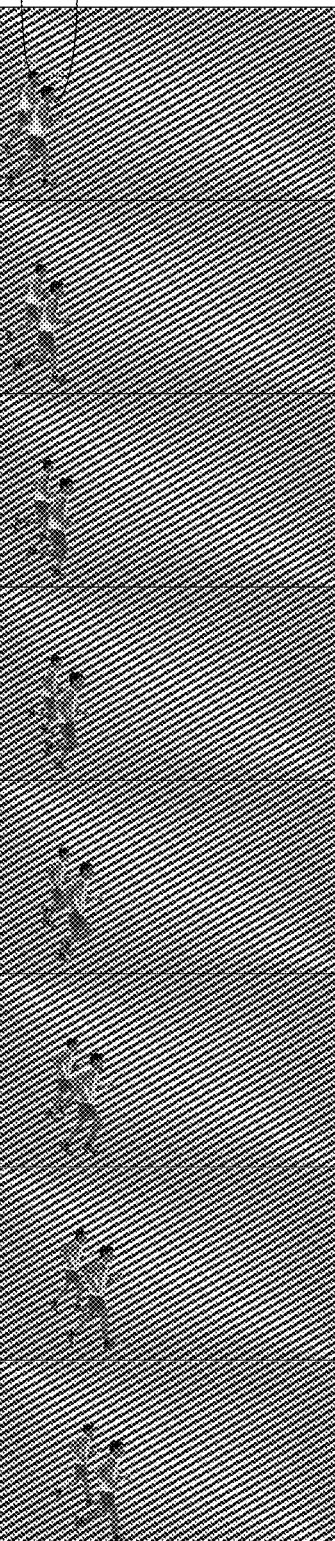
FIG. 1 illustrates an example video output provided by a method disclosed herein.

FIG. 1 illustrates an example video output provided by a method disclosed herein. The figure shows nine consecutive frames 1-9 of a video stream, with a left column showing original frames (input data) and with a right column showing output (or generated) frames (output data). The video stream includes two objects, a first object 102 (a runner distanced farther from a viewer, i.e. in the "back") and a second object 104 (a runner distanced closer to a viewer, i.e. in the "front"). For simplicity, numerals 102 and 104 are shown only in frames 1 and 9. In the original video, object 104 is running faster than object 102. In the shown output video, object 104 is selected to be played two times slower than in the original video. The outcome is that object 104 is now seen running slower than object 102.

Figure 2:
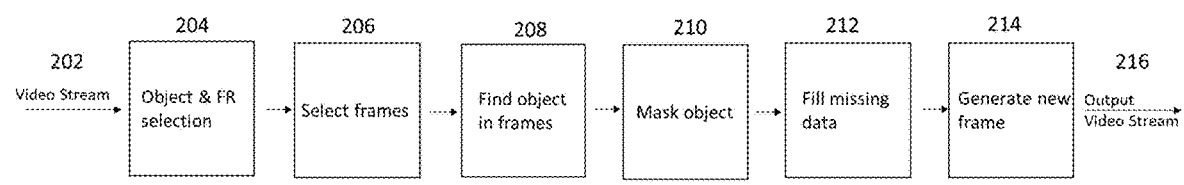
FIG. 2 shows a general flow chart of an exemplary embodiment of a method disclosed herein.

FIG. 2 shows a general flow chart of an exemplary embodiment of a method disclosed herein. A video stream (sequence of N frames) 202 recorded at a certain user- or application-assigned frame rate FR is used as input. In step 204, the user or application marks an object of interest (e.g. object 104) or region of interest and a relative velocity of the OOI or the ROI. In general, the OOI or ROI is only marked in one of the frames, e.g. in the 1$^{st}$ of the N frames. The relative velocity (or "slow motion factor") of the OOI or the ROI defines a frame rate ratio between the frame rate with which the OOI or the ROI is played, and the frame rate at which the foreground and/or background are played. In step 206, frames used for generating an output stream are selected. These are referred to henceforth as "selected frames".

In a first example and with reference to FIG. 1, one wants to make object 104 (and optionally additional segments of the frames) move half as fast as in original video stream, corresponding to a relative velocity (slow motion factor) and a frame rate ratio of 2. At least two frames need to be selected in order to obtain information on the movement of OOI 104 and on the movement of foreground FG and background BR (i.e. all the pixels in the frame except object 104). If one wants to achieve the given effect with fewer than four frames, movement models predicting the inter-frame movement have to be deployed.

The selection of at least two frames may be made in various ways. One option is presented in Table 1, Table 1

| Out$_{Idx}$ | 1 | 2 | 3 | 4 | 5 | 6 | 7 | 8 |
|---|---|---|---|---|---|---|---|---|
| Obj$_{Idx}$ | 1 | 1 | 2 | 2 | 3 | 3 | 4 | 4 |
| BG$_{Idx}$ | 1 | 2 | 3 | 4 | 5 | 6 | 7 | 8 | where Obj$_{Idx}$ axis the index of the input frame from which the OOI (i.e. object 104) is taken, BG$_{Idx}$ is the index of the input frame from which the background is taken, and Out$_{Idx}$ is the index of the respective output frame.

In step 208, the OOIs are detected in the at least two selected frames. In step 210, the algorithm calculates a segmentation mask for the OOI. In step 212, data missing (e.g. caused by occlusion) in the at least four selected frames is filled in from frames other than the selected frames (for example neighboring frames). In step 214, data and information generated in steps 204-212 is processed to generate a new frame. Newly generated frames are assembled into an output video stream 216.

In this example, one can write a general equation:

$$Obj_{Idx} = \text{ceil}\left(\frac{Out_{Idx}}{SM_{factor}}\right), BG_{Idx} = Out_{Idx},$$

where ceil(x) returns the smallest integer that is greater than or equal to x (i.e. rounds up the nearest integer) and SM$_{factor}$ is the slow-motion factor of the object (in this example SM$_{factor}$=2).

In a second example one wants to make object 104 move twice as fast as in original video stream. Again, at least two frames need to be selected. One option is presented in Table 2.

Table 2

| Out$_{Idx}$ | 1 | 2 | 3 | 4 | 5 | 6 | 7 | 8 |
|---|---|---|---|---|---|---|---|---|
| Obj$_{Idx}$ | 1 | 2 | 3 | 4 | 5 | 6 | 7 | 8 |
| BG$_{Idx}$ | 1 | 1 | 2 | 2 | 3 | 3 | 4 | 4 |

In this example, the general equation is:

$$Obj_{Idx} = Out_{Idx}, BG_{Idx} = \text{ceil}\left(\frac{Out_{Idx}}{SM_{factor}}\right).$$

Given a video of RGB images, i.e. frames $F=\{f_i\}_{i=1}^{N_{Frames}}$ and a depth map overlaying each frame $D=\{d_i\}_{i=1}^{N_{Frames}}$, methods disclosed herein generate new videos in which the pixel groups $P_{FM1}$ and $P_{FM2}$ are played at different frame rate. The depth map can be obtained using for example stereo-camera triangulation, depth from motion, gated imaging, time of flight (TOF) cameras, coded aperture based cameras, a Laser Auto-focus unit ("Laser AF"), an image sensor with Phase Detection Auto Focus ("PDAF") capability etc. In depth maps shown herein, the gray scale depicts the respective depth (white=zero distance from camera, black=infinite distance from camera). The depth maps or images discussed herein are assumed to be captured from a same POV or a similar POV as well as captured substantially simultaneously with the RGB images shown along with the depth maps.

For the sake of clarity the term "substantially" is used herein to imply the possibility of variations in values within an acceptable range. For example, "substantially simultaneously" may refer to the capture of frames for two video streams within ±5 ms, ±10 ms, ±20 ms or even ±30 ms. For example, "substantially simultaneously" may refer to the synchronization of frames from two video streams within ±5 ms, 10 ms, ±20 ms or even ±30 ms.

We distinguish two cases for the frame rate of segments of the image that are closer to the camera (i.e. $SD^-$):

Case A (Example 1): the OOI or ROI and image segments closer to the camera than the OOI or ROI (foreground FG) are played at FR1, while image segments farther from the camera (background BG) than the OOI or ROI are played with FR2. $SD^-$ is played at the same FR as SD (i.e. FR1) and all the other depths are played at FR2. Thus $P_{FR}1=SD \cup SD^-$ and $P_{FR}2=SD^+$. In this case, we do not need to indicate where the pixels of $SD^-$ are, since they are played at the same FR as SD such that OOIs or ROIs at SD will never be occluded. Therefore, we obtain FRM=BDM.

Case B (Example 2) only the OOI or ROI is played with FR1, while both FG and BG are played with FR2. $SD^-$ is played at the same FR as $SD^+$ (i.e. FR2). Thus $P_{FR}1=SD$, $P_{FR}2=SD^+ \cup SD^-$. Since SD and $SD^-$ are played with different frame rate, some information will be missing in the newly generated frames because of occlusions.

In an additional, third example, different "depth slices" (parts of the image with of a certain corresponding depth range) for example, a first depth slice 1: 0.5-1 m, a second depth slice 2: 1-2 m, and a third depth slice 3: 2-4 m, are played with different FRs. For example, the RGB information of depth slice 1 is played with FR 1, the RGB information of depth slice 2 is played with FR 2, the RGB information of depth slice 3 is played with FR 3, etc. In some examples it may be FR1<FR2<FR3 etc., or vice versa. In other examples, there may not be such a FR order according to depth. This slicing principle may be used to, for example, highlight an OOI or ROI by leaving the OOI or ROI unmoved, and let the BG move faster the more far away it is from the OOI or RO. In some examples, artificial objects may be added to one or more of the depth slices. An artificial object may be an artificially created object such as an object drawn manually or by a computer. An artificial object may be image data not included in one of the images of the input video stream. In some examples, an artificial object may be image data from an image captured with another camera of a same host device.

In other examples, a physical property of entities (e.g. an OOI or ROI) other than depth may be used for defining object, FG and BG. A physical property may be spectral composition. In yet other examples, visual data such as texture of entities (e.g. an OOI or ROI) may be used for defining object, FG and BG.

FIG. 3 illustrates respective FRMs and BDMs of a specific image for cases A and B. Here, the OOI is a dancing girl 302. Corresponding to this image is a depth map of the same scene (not shown here). Here, a depth of the scene is assumed which increases constantly for larger Y values. A constantly increasing depth is e.g. shown in FIG. 4. In the given scene, a runner 304 is closer to the camera than girl 302. In case A, the FRM and BDM include both dancing girl 302 and runner 304 (as well as all other pixels with assigned depth smaller than that of girl 302). In case B, the FRM only includes girl 302, as well as pixel groups of the BG with assigned depth equal to the assigned depth of the girl 302. For case B, the BDM is differentiated into three pixel groups with different assigned depths: the depth of OOI 302 (SD, white), a depth larger than depth of OOI 302 ($SD^+$, black), and a depth smaller than the depth of OOI 302 ($SD^-$, gray).

Figure 4:
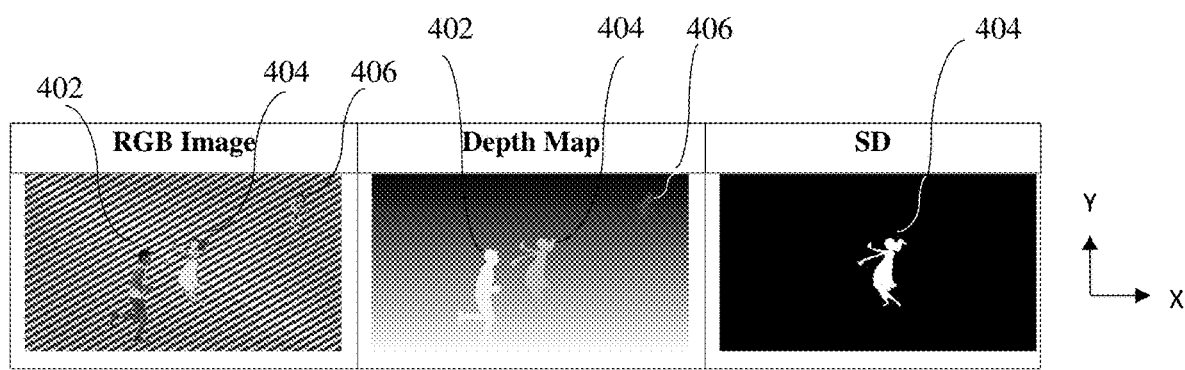
FIG. 4 presents an example of an image set of a scene containing a RGB image (left side), a depth map (center) and a derived SD (right side)

FIG. 4 presents an example of an image set containing a RGB image (left side), next to a depth map (center) covering the same scene from the same (or very similar) point of view (POV) as that of the RGB image, and next to SD map (right side) derived according to a method disclosed herein. The specific SD is chosen based on the RGB image and depth map data. A runner 402 is closest to the camera, a girl 404 is farther away from the camera, and a boy 406 is at the farthest distance from the camera. Here, girl 404 is defined as the OOI, leading to the presented specific SD.

Figure 5A:
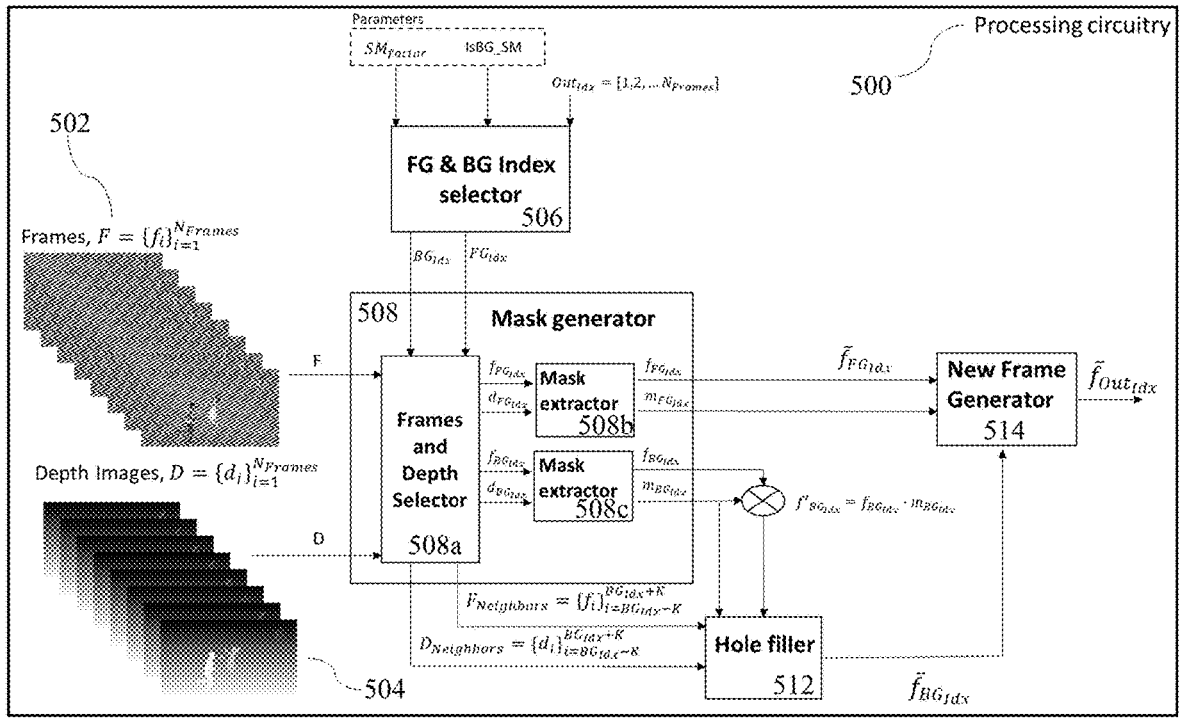
FIG. 5A shows a block diagram of an exemplary system used to run a method disclosed herein in a first example.

FIG. 5A presents a block diagram of processor numbered 500 in a system disclosed herein and used for case A. The following notations are used: foreground (FG) and background (BG) respective frames $f_{FG_{Idx}}$ and $f_{BG_{Idx}}$, corresponding respective masks $m_{FG_{Idx}}$ and $m_{BG_{Idx}}$, generated respective images $\tilde{f}_{BG_{Idx}}$ and $\tilde{f}_{FG_{Idx}}$ and a composed new output frame $\tilde{f}_{Out_{Idx}}$.

Processor 500 may be for example an application processor of a smartphone or a tablet. In processor 500, the input frames of the RGB video stream 502 and the depth map video stream 504 constitute data inputs for the method disclosed here. Depending on a FR speed chosen by a human user (e.g. manually) or chosen by a dedicated algorithm (e.g. automatically), indices of the frames to be used for the output video stream are selected by a FG and BG index selector module 506. These indices are the input for a mask generator module 508 that performs step 210 in FIG. 2. Depending on objects or areas of interest in the RGB image (also chosen by the human user or by the dedicated algorithm), the frames with the indices selected in 506 are requested from a frame and depth selector module 508a. Masks defining the areas that are played with different FRs are calculated in a mask extractor module 508b for the foreground FR, and in a mask extractor module 508c for the background BR. From module 508c, information is fed into a hole filler module 512, where missing information (e.g. because of occlusion of the object or area of interest by another object) is replaced by information calculated from input frames of RGB video stream 502 and depth map video stream 504 other than the ones actually used for the output video stream. A new frame generator module 514 assembles the information and outputs the newly generated video stream.

Figure 5B:
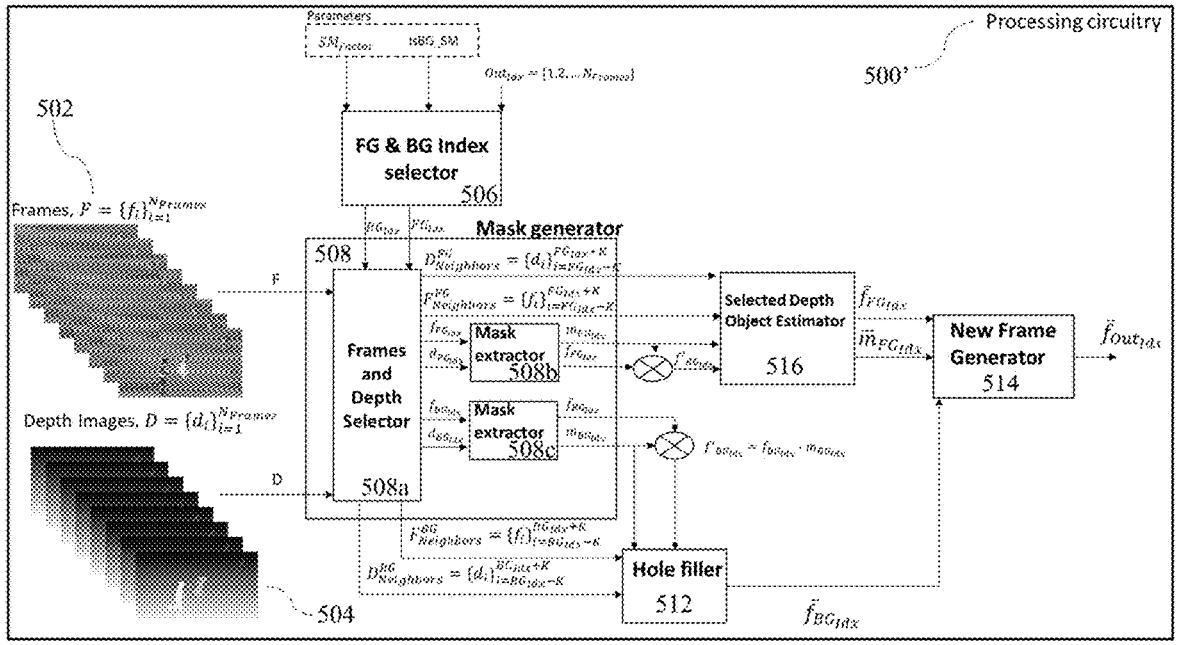
FIG. 5B shows a block diagram of an exemplary system used to run a method disclosed herein in a second example.

FIG. 5B presents a block diagram of processor numbered 500' in a system disclosed herein and used for case B. In addition to modules and functions of processor 500 in FIG. 5A, processor 500' includes an additional selected depth object estimator module 516, in which the depth of the selected object or area is estimated in case the selected object or area is occluded by another object.

Because of the more complex FRM deployed in case B compared to case A, this information must be generated, e.g. by estimation from other frames of the depth map video stream (e.g. neighboring frames), e.g. by deploying a motion model. Module 512 that computes $\tilde{f}_{BG_{Idx}}$ remains practically the same as in case A, except for mask $m_{BG_{Idx}}$ that is passed to module 512. In contrast with case A, the mask now includes only the selected depth and not SD⁻.

Figure 5C:
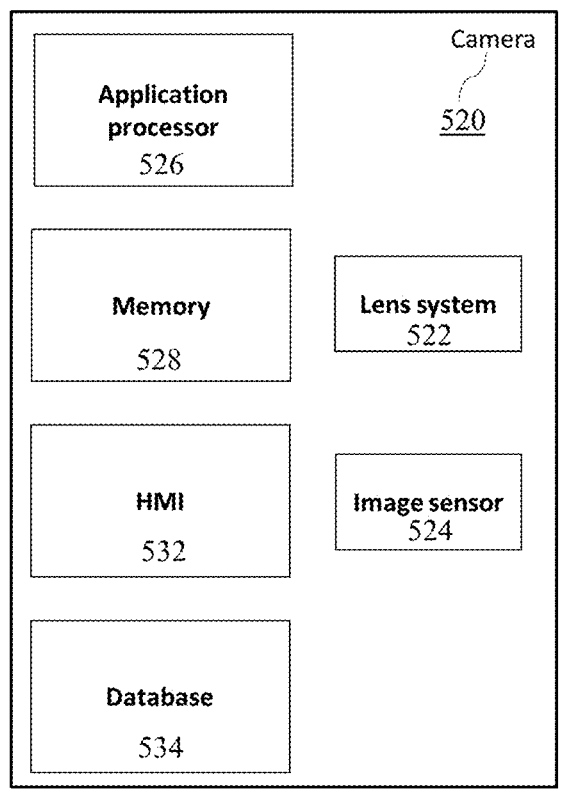
FIG. 5C shows an embodiment of a camera disclosed herein.

FIG. 5C shows an embodiment of a camera disclosed herein and numbered 520. Camera 520 includes camera elements such as optical components (i.e. a lens system) 522 and an image sensor 524. Camera 520 may be a multi-camera system that has more than one lens system and image sensor. Images and video streams recorded via lens system 522 and image sensor 524 may be processed in an application processor 526 that interacts with a memory 528. A human user can trigger actions in the camera via a human machine interface "HMI" (or simply "interface") 532. Information that supports actions such as generation of artificial image data and information may be stored in a database 534. In various embodiments, one or more of the components application processor 526, memory 528, HMI 532 and database 534 may be included in the camera. In some embodiments (such as in FIG. 5D) application processor 526, memory 528, HMI 532 and database 534 may be external to the camera.

Figure 5D:
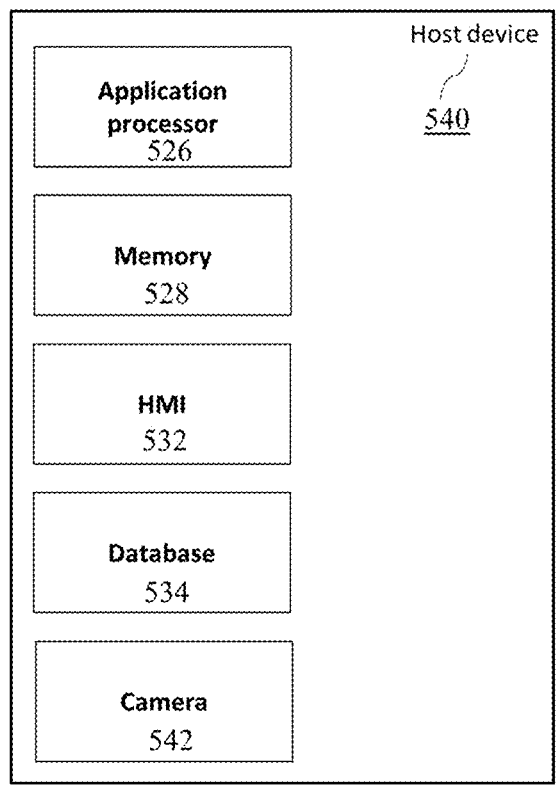
FIG. 5D shows an embodiment of a host device disclosed herein.

FIG. 5D shows an embodiment of a host device disclosed herein and numbered 540, for example a smartphone or tablet. Device 540 comprises a camera 542, application processor 526, memory 528, HMI 532 and database 534. In some embodiments, database 534 may be virtual, with information not located physically on the device, but located on an external server, e.g. on a cloud server. Device 540 may comprise a multi camera system, e.g. several cameras for capturing RGB images and one or more additional sensing cameras, e.g. a time of flight (TOF) camera sensing depth information of a scene.

In some examples, camera 542 may provide the video stream input for the method described herein. In other examples, the video stream input may be supplied from outside a host device, e.g. via a cloud server.

Figure 6A:
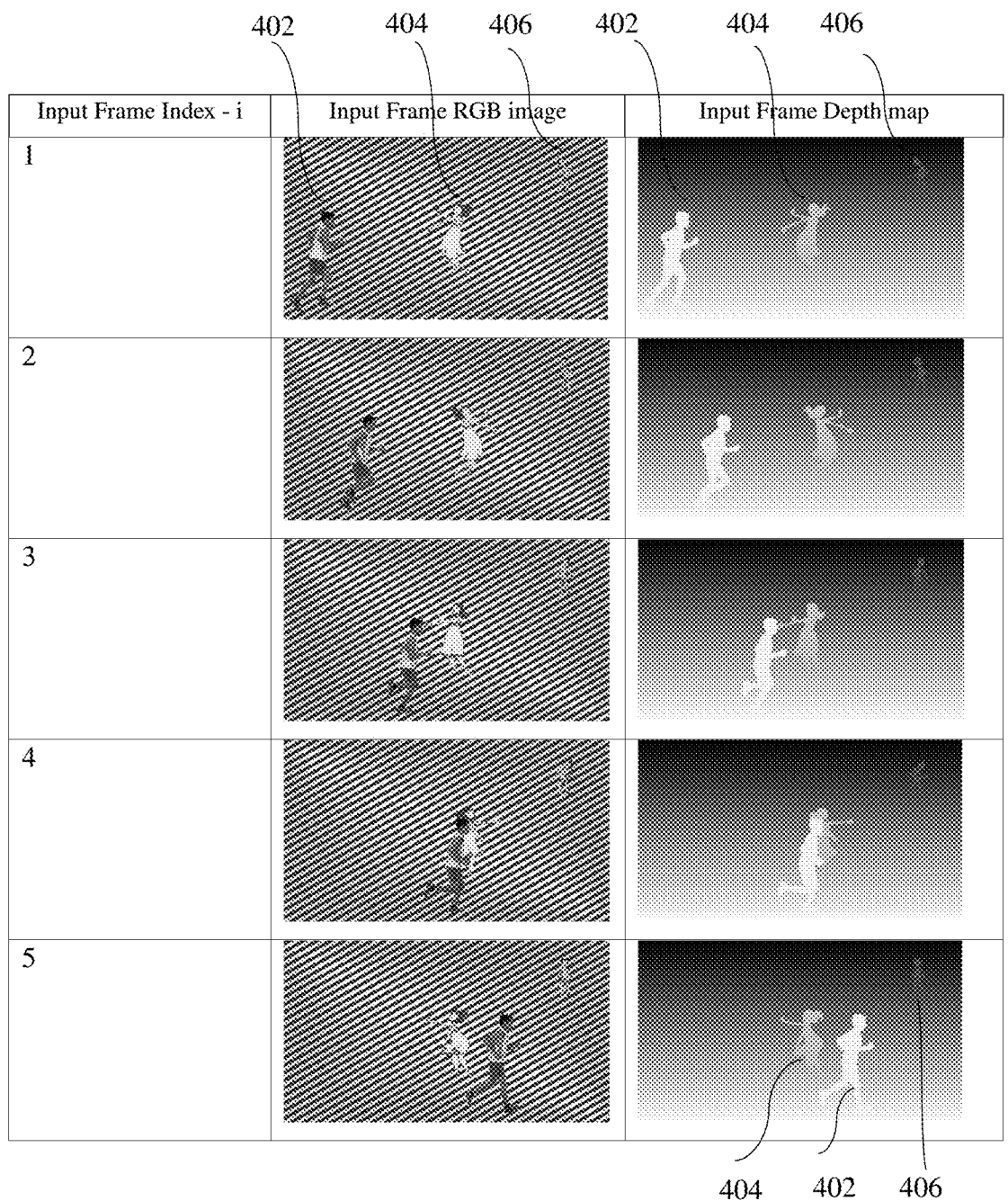
FIG. 6A shows a video RGB input stream and a video depth image input stream of the same scene.
Figure 6B:
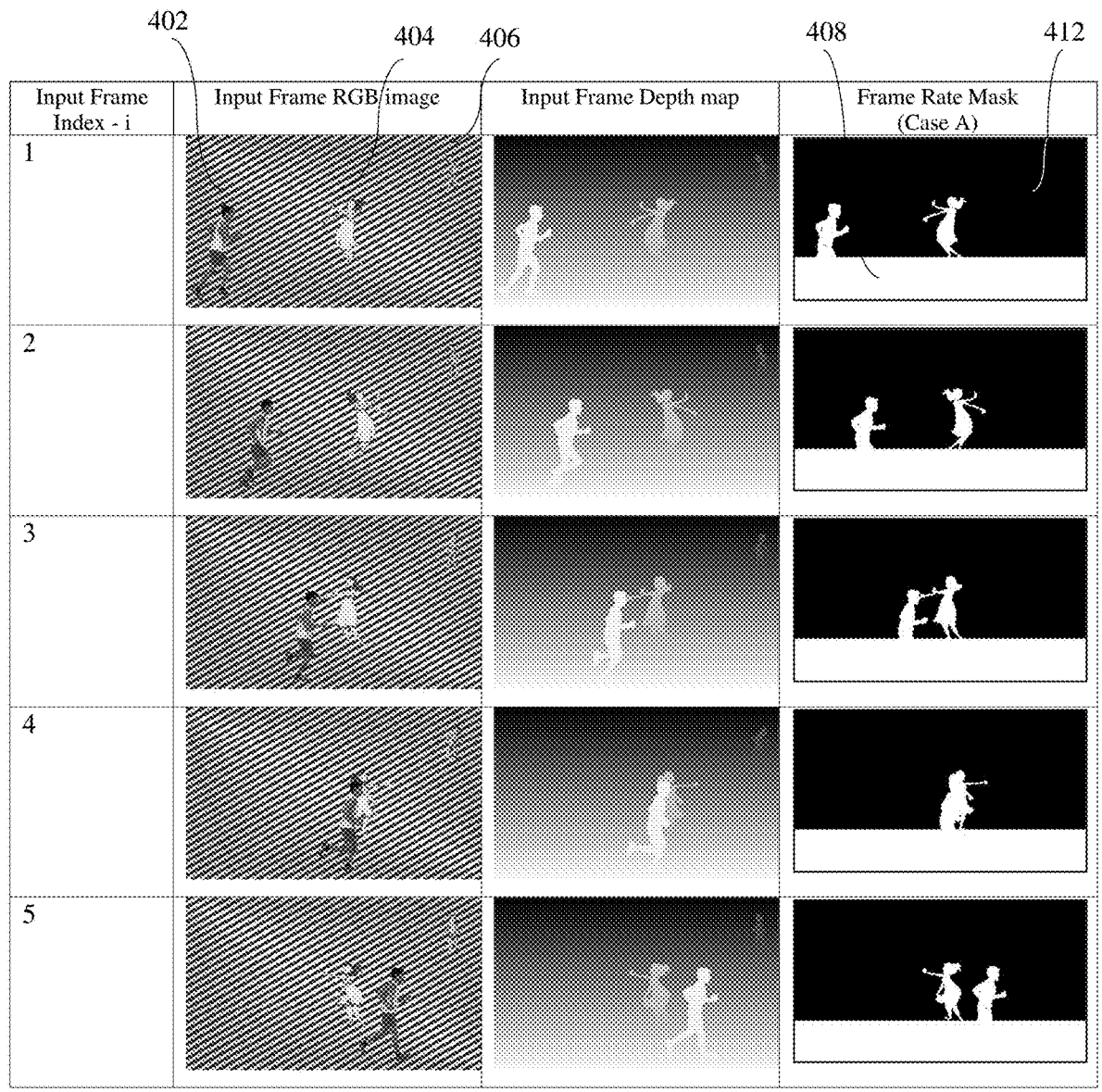
FIG. 6B shows the FRM generated for the input video streams of FIG. 6A for case A.
Figure 6C:
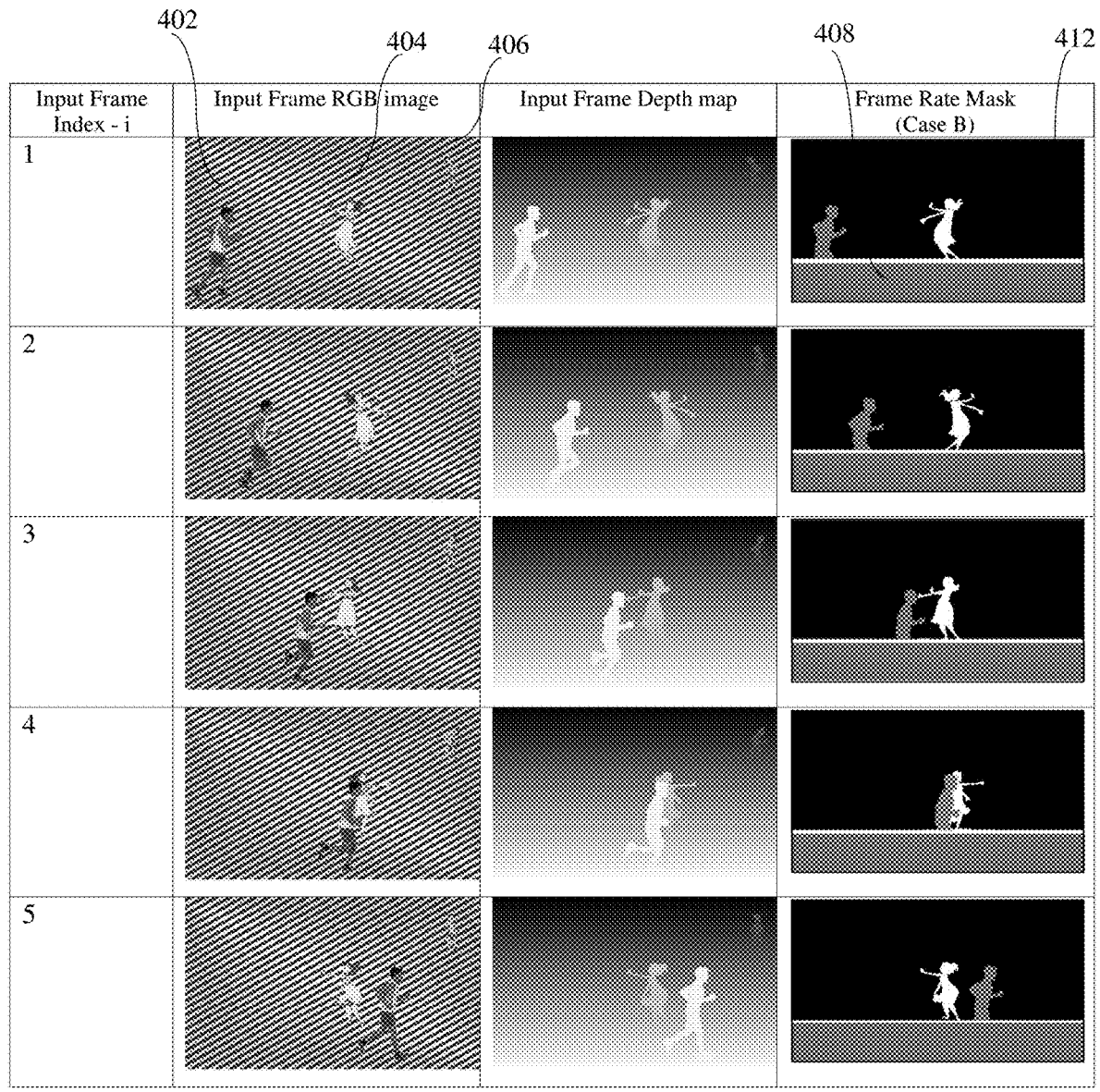
FIG. 6C shows the FRM generated for the input video streams of FIG. 6A for case B.

FIGS. 6A-6C depict the generation of FRMs for the cases A and B outlined below. FIG. 6A shows two input video streams of the same scene as in FIG. 4, one input stream (left) being of RGB images (also referred to as "RGB image stream"), the other input stream (right) being of depth images (also referred to as "depth image stream"). As in FIG. 4, the images include runner 402, girl (OOI) 404 and boy 406. FIG. 6B shows the FRM generated for the input video streams of FIG. 6A for case A. FIG. 6C shows the FRM generated for the input video streams of FIG. 6A for case B. In input frame 4, we find that girl 404 is partly occluded by runner 402.

In FIG. 6B, the FRM includes the selected depth SD and all the depths closer to the camera SD⁻. In this case, the mask that needs to be extracted from the depth image is a binary mask that indicates where SD and SD⁻ are located in the RGB image. In the binary mask, "1" (white) represents the regions of SD and SD⁻ and "0" (black) represents all other depths. Foreground 408 and background 412 refers to segments of the image that have an assigned depth that is smaller and larger than the selected depth respectively.

The following describes a general method to provide effects like those in the first and second examples above in more detail. In step 206, FIG. 2, two frames are extracted from the input video streams. An output frame will be composed of these two frames, one frame being used for forming the background $f_{BG_{Idx}}$ and the other frame being used for forming the foreground $f_{FG_{Idx}}$. $BG_{Idx}$ and $FG_{Idx}$ are indices that indicate which frame from the input frames, F, are selected, thus, $BG_{Idx}, FG_{Idx} \in [1, 2 \ldots N_{Frames}]$.

Once the indices from the input frames are chosen, the selected depth masks for the images need to be extracted.

The next step after the extraction of $BG_{Idx}$ and $FG_{Idx}$ is to select the BG and FG frames $f_{FG_{Idx}}$ and $f_{BG_{Idx}}$ together with their corresponding masks $m_{FG_{Idx}}$ and $m_{BG_{Idx}}$ and to generate the two image frames $\tilde{f}_{BG_{Idx}}$ and $\tilde{f}_{FG_{Idx}}$ that will be combined ("stitched") together to compose the new output frame $\tilde{f}_{Out_{Idx}}$. Since the regions of selected depths are never occluded, $\tilde{f}_{BG_{Idx}}$ can be obtained directly from the input frame and the corresponding mask. Therefore, $\tilde{f}_{FG_{Idx}} = f_{FG_{Idx}} \cdot m_{FG_{Idx}}$.

To obtain $\tilde{f}_{BG_{Idx}}$, we need to delete the region in the image where $m_{BG_{Idx}}$ indicates the selected depth, and fill this region with the background. To delete the region with the selected depth, we can for example use $f'_{BG_{Idx}} = m_{BG_{Idx}} \cdot f_{BG_{Idx}}$. To fill the missing information in the background, we can use methods such in-painting (see e.g. Bertalmio, Marcelo, Andrea L. Bertozzi, and Guillermo Sapiro. "Navier-Stokes, fluid dynamics and image and video inpainting." *Computer Vision and Pattern Recognition*, 2001. CVPR 2001. Proceedings of the 2001 IEEE Computer Society Conference on. Vol. 1. IEEE, 2001) or utilize information from consecutive frames (see e.g. Jia, Yun-Tao, Shi-Min Hu, and Ralph R. Martin. "Video completion using tracking and fragment merging." *The Visual Computer* 21.8-10 (2005): 601-610). The indices of the input frames which will be used to fill the holes in $f'_{BG_{Idx}}$ are: $[BG_{Idx}-k, BG_{Idx}+k]$, where k is a parameter that indicates the number of consecutive frames from each side of $f_{BG_{Idx}}$. In general, k does not have to be constant, and can be different from frame to frame, in which case it will be marked as $k_{Out_{Idx}}$.

Once we have $\tilde{f}_{BG_{Idx}}$ and $\tilde{f}_{FG_{Idx}}$, they can be stitched together using $m_{FG_{Idx}}$ and methods described for example in Burt, Peter J., and Edward H. Adelson. "A multiresolution spline with application to image mosaics." *ACM Transactions on Graphics (TOG)* 2.4 (1983): 217-236.

In case A, we used the depth map to detect the selected depth and all the depths closer to the camera, which were to be played at the same FR. This causes objects in the RGB image with corresponding selected depth to have all the information needed to generate the new frame in the output video in each frame.

In case B, we use the depth map in order to detect the regions of selected depth, which are to be played at the same FR. All regions with other corresponding depths are to be played at a different FR. Here, in general, the object in the selected depth will not contain all the information needed to compose the new frame (see e.g. input frame 4 in FIG. 6A), and there is a need to generate this information, e.g. by algorithms generating artificial input based on prior "experience", or from other frames, e.g. from subsequent consecutive frames (e.g. by using a motion model). In this case, it is possible that an object that is closer to the camera than the selected depth will occlude parts of the objects in the selected depth, so that the FG frame and the corresponding mask will have holes where data is missing.

FIG. 6C shows the FRM generated for the input video streams of FIG. 6A for case B. In input frame 4, we find that girl 404 is partly occluded by runner 402.

The selection of the frame indexes from the input remains the same as in case A. The mask extracted from the depth image for the selected depth–$m_{FG_{Idx}}$ does not contain all the information for the objects in the selected depth and therefore a new mask $\overline{m}_{FG_{Idx}}$ needs to be defined. This mask is not extracted from the depth image, but estimated, e.g. by using information from other frames.

The information of the object in the selected depth that exists in $f_{FG_{Idx}}$ will be referred to as $f'_{FG_{Idx}} = f_{FG_{Idx}} \cdot m_{FG_{Idx}}$. The frame with full object information within the selected depth derived e.g. based on information from consecutive frames) is given by $\bar{t}_{FG_{Idx}}$.

Figure 7:
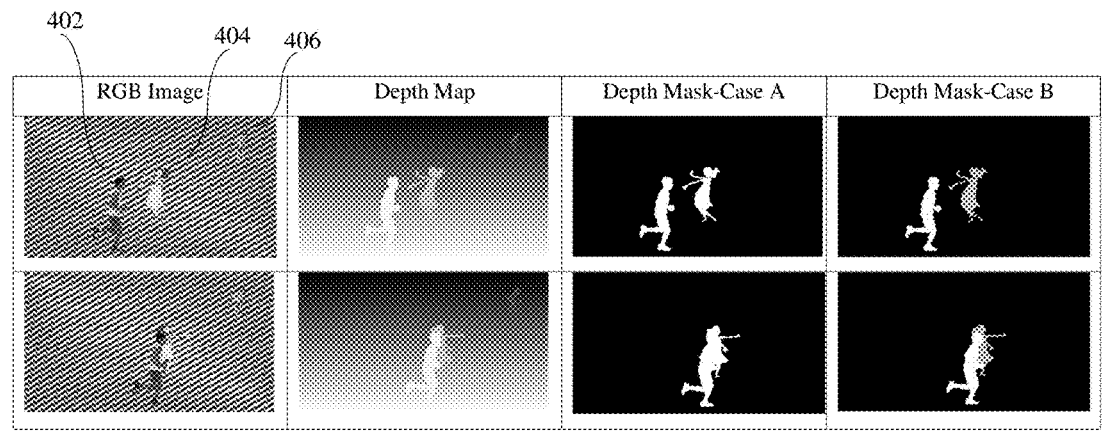
FIG. 7 presents RGB images, depth maps and selected depth masks from frames related to the scene in FIGS. 6A-C that does and does not contain all object information.

FIG. 7 presents RGB images (first column), corresponding depth maps (second column) and the selected depth mask (third column for case A, fourth column for case B) from a frame related to the scene in FIGS. 6A-C that does not contain all information of the object in the selected depth. The situation of missing data in case B as described above is illustrated in the second row of FIG. 7, where the information on the mask is missing because of occlusion of an object caused by another object.

In case A, the mask is a binary mask. In case B, the mask is a mask with three values: 0 (black) 0.5 (gray) and 1 (white).

Figure 8A:
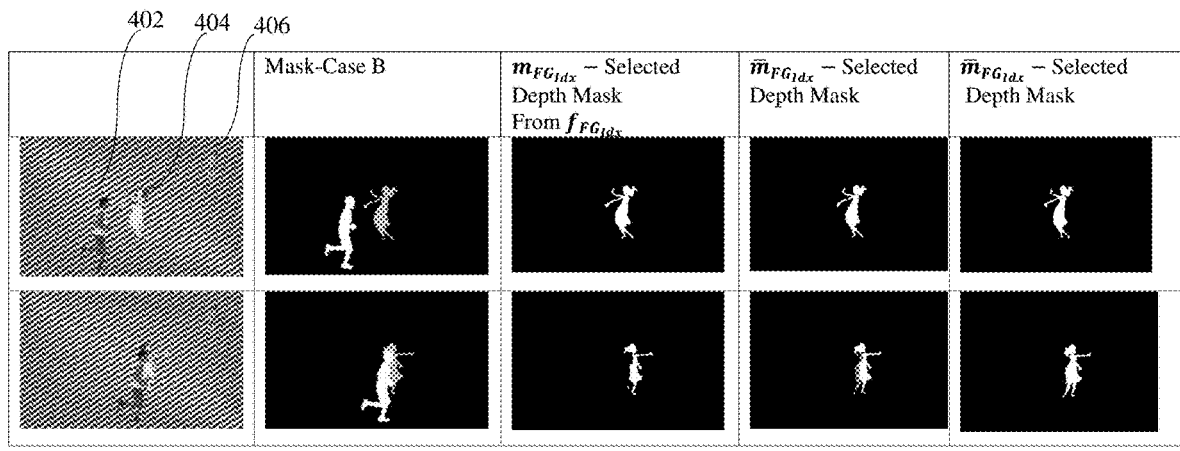
FIG. 8A presents RGB images, depth masks and the depth information reconstruction process of case B for complete (first row) and incomplete (second row) depth mask information.

FIG. 8A presents the same RGB images as shown in FIG. 7 having a same corresponding depth map (not shown) that is shown in FIG. 7 (first column) and the information reconstruction process for the depth map part (second to fifth column) for case B, both for the case of complete depth map information (row 1), and for the case of incomplete depth map information because of occlusion (row 2). In the second row and fourth column, selected depth masks are presented that partly need to be generated, e.g. by estimations based on information of other frames: the gray parts in the mask are parts that are to be generated. In the fifth column, the selected depth mask with generated information is shown. This depth mask can further on be used for the new output frame composition.

Figure 8B:
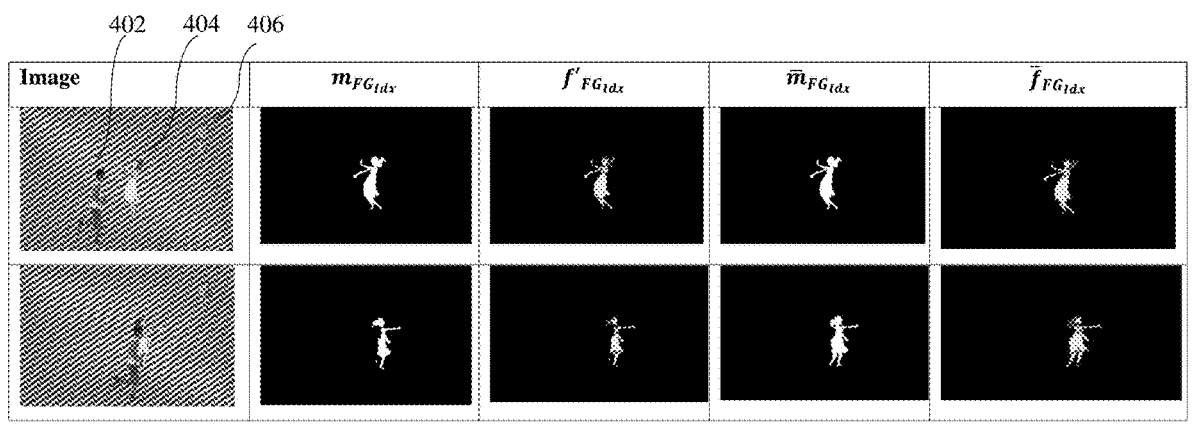
FIG. 8B shows case B selected depth masks and RGB image segments derived with these masks for complete (first row) and incomplete (second row) image information.

FIG. 8B shows, along with the selected depth masks (second and fourth column), the respective masked RGB image segments (third column) and the RGB output frame of the computational step which fills missing data from neighboring frames (step 212 in FIG. 2) in the last (fifth) column.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

It will also be understood that the presently disclosed subject matter further contemplates a suitably programmed computer for executing the operation as disclosed herein above. Likewise, the presently disclosed subject matter contemplates a computer program being readable by a computer for executing the method as disclosed herein. The presently disclosed subject matter further contemplates a non-transitory computer-readable memory tangibly embodying a program of instructions executable by the computer for executing the method as disclosed herein.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A system, comprising:
    a digital camera configured to record an input video stream at an assigned frame rate;
    an interface operated to mark a first entity in a frame of the input video stream and a slow motion factor of the first entity, and to determine based on the slow motion factor a first frame rate FR1 for playing of the first entity in an output video stream and a second frame rate FR2 different from FR1, for playing of at least one second entity in the output video stream, wherein at least one of FR1 or FR2 is different from the assigned frame rate; and
    a processor configured to generate the output video stream based on the input video stream of the digital camera, the marked first entity, and the determined FR1 and FR2, wherein the output video stream includes the first entity played at FR1 and the at least one second entity played at FR2.

2. The system of claim 1, wherein the first entity is an object of interest (OOI) or region of interest (ROI) and wherein the at least one second entity is selected from the group consisting of another object, an image foreground, an image background and a combination thereof.

3. The system of claim 2, wherein the interface is operated by a human user.

4. The system of claim 3, wherein the OOI or the ROI is identified in at least one single frame of the input video stream with an object classification or an object segmentation algorithm.

5. The system of claim 4, wherein the OOI or ROI is tracked at least through a part of the input video stream with a tracking algorithm.

6. The system of claim 2, wherein the interface is operated by an application or by an algorithm.

7. The system of claim 1, wherein the output video stream includes at least one added entity played at a frame rate different from FR1 and FR2.

8. The system of claim 1, wherein the given input stream includes at least one given entity played at a frame rate different from FR1 and FR2.

9. The system of claim 1, wherein the processor is further configured to use a depth map stream that is spatially and temporally aligned with the input video stream to generate the output video stream.

10. The system of claim 9, wherein the depth map is used to determine a depth of each entity.

11. The system of claim 9, wherein the depth map is a discrete depth map of several classes, each class covering a range of specific depths.

12. The system of claim 11, wherein an entity is played with a frame rate that depends on the class covering a range of specific depths.

13. The system of claim 9, wherein the depth map is generated using image data of a Time-of-Flight camera.

14. The system of claim 9, wherein the depth map is generated using image data of a stereo camera.

15. The system of claim 9, wherein the depth map is generated using a laser autofocus unit.

16. The system of claim 9, wherein the depth map is generated using Phase Detection Auto Focus.

17. A method, comprising: by a processor configured to obtain an input video stream recorded at an assigned frame rate and to output an output video stream,
    marking a first entity in a frame of the input video stream;
    marking a slow motion factor of the first entity;
    determining based on the slow motion factor a first frame rate FR1 for playing of the first entity in the output video stream and a second frame rate FR2 different from FR1, for playing of at least one second entity in the output video stream, wherein at least one of FR1 or FR2 is different from the assigned frame rate; and
    generating the output video stream, wherein the output video stream includes the first entity played at FR1 and the second entity played at FR2.

18. The method of claim 17, further comprising using a depth map to determine a depth of each entity.

19. The method of claim 17, wherein the given input stream includes at least one given entity played at a frame rate that is different from FR1 and FR2.

20. The method of claim 17, further comprising using a depth map stream that is spatially and temporally aligned with the input video stream to generate the output video stream.

21. The method of claim 20, wherein the depth map is generated by using image data of a Time-of-Flight camera.

22. The method of claim 20, wherein the depth map is generated by using image data of a stereo camera.

23. The method of claim 20, wherein the depth map is generated by using a Laser Autofocus unit.

24. The method of claim 20, wherein the depth map is generated by using Phase Detection Auto Focus.

* * * * *